United States Patent [19]

Burgmeier et al.

[11] 4,302,693
[45] Nov. 24, 1981

[54] WEDGE SHAPED PERMANENT MAGNET ROTOR ASSEMBLY WITH MAGNET CUSHIONS

[75] Inventors: Lyman R. Burgmeier, Cypress; Frederick B. McCarty, San Pedro; Alexander Silver, Tarzana, all of Calif.

[73] Assignee: The Garrett Corporation, Los Angeles, Calif.

[21] Appl. No.: 973,343

[22] Filed: Dec. 26, 1978

[51] Int. Cl.³ ............................................ H02K 21/12
[52] U.S. Cl. .................................... 310/156; 310/262
[58] Field of Search ............... 310/156, 261, 262, 264, 310/265, 218

[56] References Cited

U.S. PATENT DOCUMENTS

| 2,719,931 | 10/1955 | Kober | 310/156 |
|---|---|---|---|
| 3,072,813 | 1/1963 | Reijnst et al. | 310/156 |
| 3,083,311 | 3/1963 | Krasnow | 310/156 |
| 3,943,698 | 3/1976 | Ono | 310/156 X |
| 4,117,360 | 9/1978 | Richter | 310/156 X |

*Primary Examiner*—Mark O. Budd
*Attorney, Agent, or Firm*—Fay I. Konzem; Albert J. Miller

[57] ABSTRACT

A rotor having wedge-shaped permanent magnets and cushions between the magnets and their support members.

27 Claims, 6 Drawing Figures

WEDGE SHAPED PERMANENT MAGNET ROTOR ASSEMBLY WITH MAGNET CUSHIONS

CROSS-REFERENCE TO RELATED APPLICATIONS

This invention relates to subject matter disclosed in concurrently filed patent applications Ser. No. 973,346 by Alexander Silver, Frederick B. McCarty, entitled "Wedge-Shaped Permanent Magnet Rotor Assembly"; Ser. No. 973,345 by Jerry Glaser, entitled "Rotor Assembly Having Anchors With Undulating Sides"; and Ser. No. 973,344 by Alexander Silver, entitled "Rotor Assembly Having Rectangularly Shaped Tongues."

BACKGROUND OF THE INVENTION

This invention relates to permanent magnet rotors and, more particularly, to rotors with wedge-shaped permanent magnets and cushions between the magnets and their support members.

A permanent magnet generator generally consists of a rotor including an even number of equally spaced, alternating polarity magnets around the radial periphery and a stator which includes a number of windings arranged to obtain magnetic coupling with the rotor poles. Rotation of the rotor causes the flux linkage of the permanent magnets with respect to the stator coils to vary, thus inducing an electromotive force in each of the stator coils.

In the prior art, the rotor permanent magnets have been rectangularly shaped and supported against centrifugal load by a hoop shrunk over the rotor's periphery. The magnets have relatively poor tensile stress but fairly good compressive strength so they should be compressively retained. In the case of high speed rotors, the thickness of the magnet retaining hoop greatly increased, disproportionate to other parts of the rotor, because self-stress of the hoop was large and little structural capacity remained available to carry the magnets. Also, difficulties arose in uniformly distributing the magnet load into the hoop, and this introduced bending stress concentrations into the hoop. Also, as the hoop thickness was increased, reluctance of the magnetic circuit increased and pole head leakage increased. Since magnets generally have very little ductility and tend to be fragile, another problem encountered by the permanent magnets at high speeds was that they would fracture due to excessive stress concentrations at their support surfaces.

SUMMARY OF THE INVENTION

The permanent magnet rotor, in accordance with the invention, includes a rotatable hub with a plurality of inwardly converging wedge-shaped support members located around and affixed to the hub and outwardly converging wedge-shaped permanent magnets which are radially located within the slots between the support members. The rotor also includes cushions located between the support members and the magnets to prevent occurrence of excessive, localized stresses at the interface of the magnets and the support members.

Advantages of the present invention are that the rotor can rotate at a higher tip speed and also achieve better utilization of the magnet's field than the prior art rotors. The magnets are held in place in the support member by their wedge-shape without a thick hoop intervening between the magnets and the stator. Structural retention of magnets is provided by an internal hub of material proportioned such that it has little or no effect on the exciting flux.

Additionally, the cushions between the magnets and the pole body material protect the magnets from fracturing at high speeds.

DETAILED DESCRIPTION OF THE PREFERRED EMBODIMENT

Figure 1:
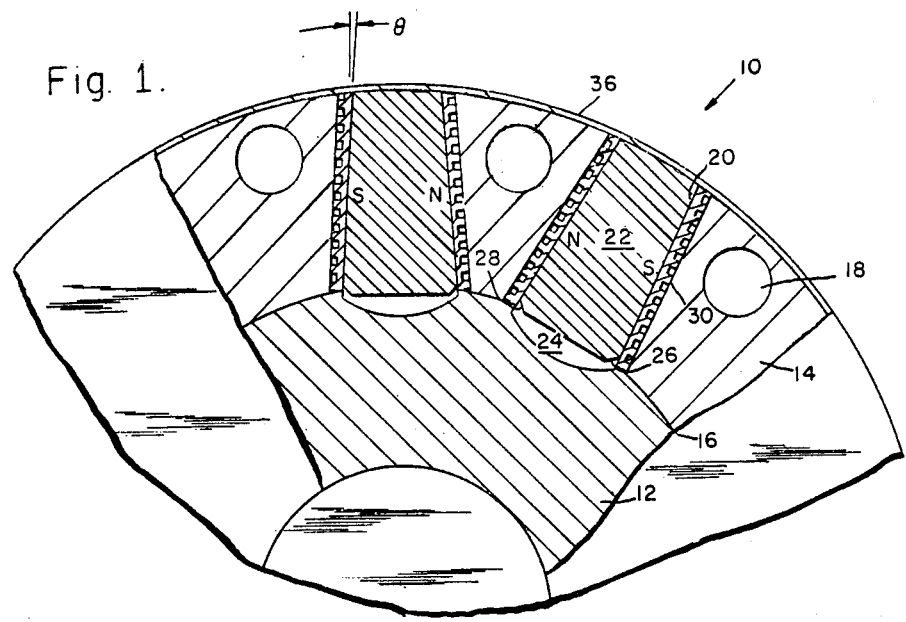
FIG. 1 is a cross-section view of the rotor assembly of the present invention with tangentially magnetized magnets.
Figure 2:
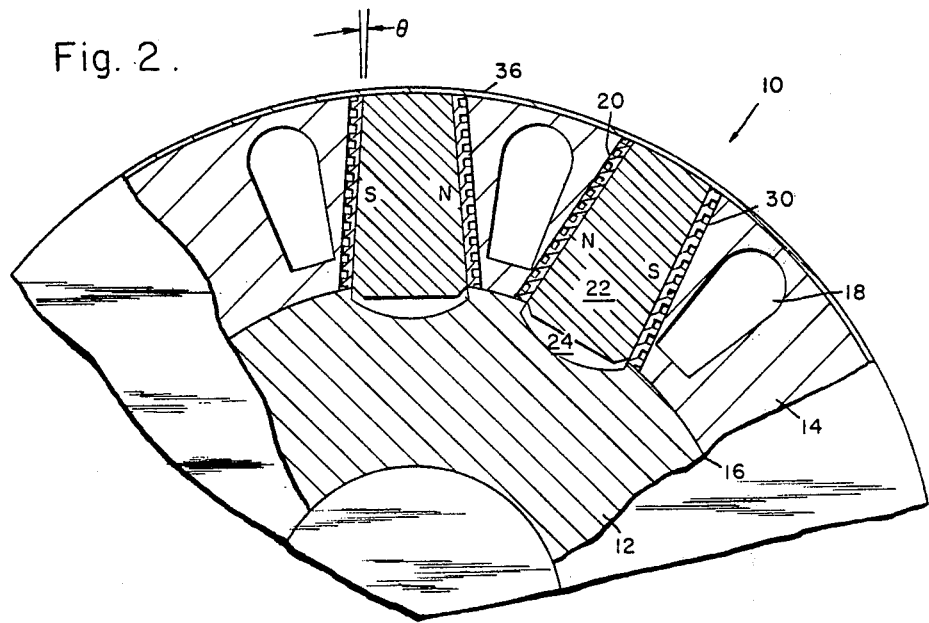
FIG. 2 shows a variance of the embodiment of FIG. 1.

Referring now to FIGS. 1 and 2, a permanent magnet rotor assembly 10 includes a cylindrically shaped hub 12 which is surrounded by and affixed to support members 14. The hub 12 consists of a non-magnetic material and the support members 14 consist of a ferromagnetic material when tangentially magnetized magnets are used. The hub 12 and the support members 14 are joined at the junction 16. A variety of conventional methods can be used to join the hub 12 and the support members 14; namely, furnace brazing the two materials together, using a cast bonding technique, diffusion bonding or bonding by the hot isostatic pressure (HIP) process.

The support members 14 have a plurality of generally equally spaced holes disposed near the periphery thereof for reducing the rotor mass so that the rotor 10 can operate at high speeds. The holes 18 can be of a variety of shapes, the circular shaped holes as shown in FIG. 1 being the easiest to fabricate, whereas, the oblong-shaped holes as shown in FIG. 2 are more difficult to fabricate into the support members 14 but result in lighter weight and a higher tip speed limit. The size and location of the holes 18 is established with regard to magnetic and structural considerations.

The centrifugal stresses in the rotating rotor 10 are a function of radial dimensions, i.e. the centrifugal forces get greater the farther out from the center of the rotor 10. Therefore, in order to reduce the stresses at critical sections (such as at the bonded joint 16) mass is removed from the pole body 14 as near to the periphery of the pole body 14 as magnetic, structural, and manufacturing considerations allow.

Besides allowing higher tip speed, the holes 18 permit cooling air flow through the pole body 14 and help to dissipate rotor surface heat caused by eddy currents. Since the stator of a generator or motor is not a smooth surface, but has iron teeth which cause ripple in the air gap flux, eddy currents exist in the rotor surface and cause heating. Excessive temperature is harmful to the structural and magnetic properties of the rotor and magnets.

The support members 14 provide a plurality of outwardly converging substantially wedge-shaped slots 20 that are radially disposed about the hub 12.

The size of the angle formed between the wall of the slots 20 and a plane parallel to a central radius through the magnet is critical and should be slightly less than the angle of friction. This angle is experimentally determined and is the maximum angle at which a locking wedge action is achieved for the material and conditions pertinent to a given design. If the angle is too large the magnets will not remain locked in place after the rotor ceases to rotate and if the angle is too small, lateral crushing forces may cause the magnet to fracture. Therefore, there is a critical range within which the locking angle $\theta$ must lie. It has been found that the size of the locking angle $\theta$ should be between 2 to 9 degrees, preferably 6 to 8 degrees.

A plurality of wedge-shaped magnets 22 of substantially the same shape as the slots 20 are placed in each of the slots 20. The magnets 22 are composed of a permanent magnet material. The base of the magnet 22 can have slightly rounded corners 26 and 28 for easy insertion into the slots 20.

The magnets 22 are shorter in length than the depth of the slot 20 thereby forming a gap 24 between the base of the magnet 22 and the bottom of the slot 20. The purpose of the gap 24 is to provide a stress relieving radius at the root of the support members 14, to facilitate assembly, and to further cool the rotor 10 permitting cooling air to flow through the rotor assembly.

A ferromagnetic cushion 30 is located on both sides of each of the permanent magnets 22 between the magnet 22 and the support members 14. The purpose of the cushion 30 is to protect the relatively fragile permanent magnets from fracturing at high speeds.

A thin hoop 36 which is heat shrunk upon the peripheral surface of the support members 14 functions as an electric damper to intercept and diminish the flux harmonics caused by the stator and penetrating into the support members 14 and into the magnet 22. Reflecting eddy currents are produced in the hoop 36, thereby shielding the permanent magnet 22 and the support members 14. The hoop 36 has a minor structural function, providing a retaining force over the peripheral contact with the magnets 22 and the support members 14. This retaining force is small and merely supplemental to the retaining provided by the hub 12. The hoop 36 consists of a high strength, non-magnetic material preferably having a low resistivity, such as a beryllium copper alloy.

Figure 3:
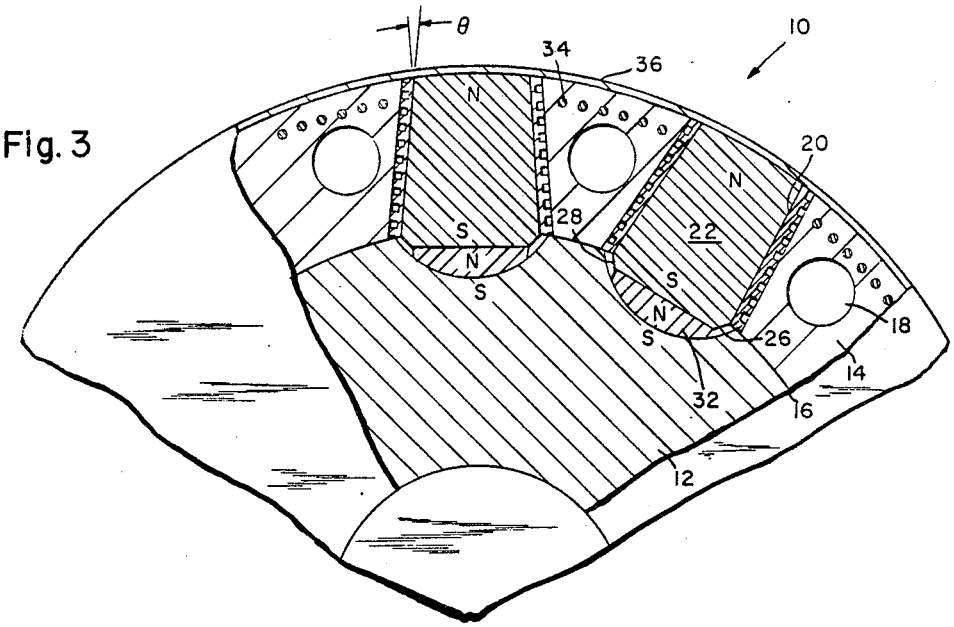
FIG. 3 is a variation of FIG. 1, whereby the magnets are radially magnetized and with dampening bars.

FIG. 3 shows a rotor assembly with radially magnetized magnets 22. With the radially magnetized magnets 22, the hub 12 consists of a magnetic material and the support members 14 consist of a non-magnetic material. With the radially magnetized magnets 22 of FIG. 3, the gap 24 is filled with a closure shim 32. The shim 32 consists of a ferromagnetic or a permanent magnet material to substantially reduce the reluctance which an air gap created by gap 24 would create. The shim 32 is inserted into the gap 24 after the magnet 22 has been rotated and thereby locked in place as described above.

The rotor assembly 10 of FIG. 3 also has electrically conductive, non-magnetic dampening bars 34 which are located near the rotor's periphery and extend through the support members 14. When used with the dampening hoop 36 the bars 34 provide added electrical dampening. Alternatively, the bars 34 can be used without the hoop 36 to intercept and diminish the flux harmonics caused by the stator, and terminate at each end of the rotor in an electrically conductive ring.

Figure 4:
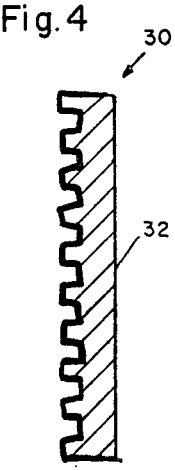
FIG. 4 is a side view of the cushion of the rotor assembly.
Figure 5:
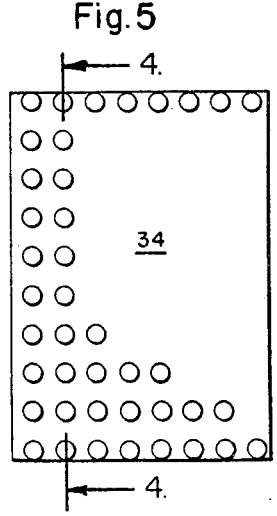
FIG. 5 is a front view of the perforated side of the cushion.

Referring to FIGS. 4 and 5, the cushion 30 has a smooth side 32 and an embossed or patterned side 34. The embossed side 34 of the cushion 30 is preferably in contact with the support member 14. The side of the cushion 30 preferably fits flush against the magnet 22 so that no gap in the flux path exists between the cushion 30 and the magnet 22. The purpose of the embossed side 34 of the cushion 30 is to provide room for the material of the cushion 30 to locally yield or flow and thus avoid excessive localized stresses or pressure between the support member 14 and the permanent magnet 22, which could otherwise exist due to manufacturing tolerances or due to deformations of the support members 14 and/or deformations of the magnets 22 with changing temperature or speed. The embossed side 34 also allow the cushion 30 to conform to the shape of the space between the support member 14 and the magnet 22. The embossed pattern is designed to provide a low bulk modulus and to provide spaces so that the material can flow locally where stresses are high because of manufacturing inaccuracies or distortion caused by the high operating speeds.

The embossed pattern permits greater freedom in selecting the optimum cushion material for transmission of magnetic flux without saturation. The mechanical properties can be achieved by adjusting the hole pattern area to achieve an effective yield stress that exceeds the average stress required to support the magnet loads at speed but is below the yield stress of the magnet material.

Non-magnetic materials such as aluminum or epoxy filled fiberglass can be used for the cushion where low yield strength and large material flow is required.

Figure 6:
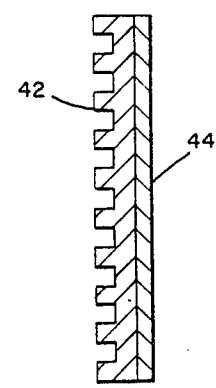
FIG. 6 shows a variation of FIG. 4, with a multiple layer cushion.

In another embodiment, as shown in FIG. 6, a multiple layer cushion 40 is used to protect the relatively fragile magnets 22 from fracturing at high speeds. A layer 42 of the cushion 40 has an embossed surface and a smooth surface. And a layer 44 has two smooth surfaces. The embossed surface of the layer 42 would be in place adjacent to the support members 14.

Installing the magnets 22 into the rotor assembly consists of first placing the cushions 30 in contact with the walls of the slots 20 followed by inserting the magnets into the base of slot 20 followed by rotating the rotor 10 at its maximum allowable speed. During rotation the magnets 22 move radially outward due to centrifugal force. The magnets 22 remain locked in place in the slots 20 even after the rotor has ceased rotating due to the compressive forces exerted on the magnets 22 by the walls of the support members 14. The outer portions of the support members 14 and the magnets 22 are then ground to the proper dimensions and the hoop 36 is shrunk onto the periphery, thus completing the assembly.

While specific embodiments of the invention have been illustrated and described, it is to be understood that these embodiments are provided by way of example only and the invention is not to be construed as being limited thereto, but only by the proper scope of the following claims:

What is claimed is:

1. A permanent magnet rotor assembly comprising:
   a rotatable hub;
   a plurality of inwardly converging wedge-shaped support members equally spaced around the periphery of said hub and affixed thereto;
   a plurality of outwardly converging wedge-shaped permanent magnets located between said support members;
   plastically deformable cushion means located between said support members and said magnets for uniformly distributing the compressive stresses existing between said support members and said magnets.

2. A rotor assembly as recited in claim 1, further comprising:
electrical dampening means located around the peripheral surface of said support members.

3. A rotor assembly as recited in claim 2, wherein said electrical dampening means comprises a hoop.

4. A rotor assembly as recited in claim 2, further comprising:
electrical dampening bars located within and extending through said support members.

5. A rotor assembly as recited in claim 1, wherein said support members having a plurality of holes for lightening the rotor.

6. A rotor assembly as recited in claim 5, wherein said holes are substantially circularly shaped.

7. A rotor assembly as recited in claim 5, wherein said holes are generally oblong-shaped.

8. A permanent magnet rotor assembly as recited in claim 1, wherein said hub comprises a non-magnetic material and said support members comprise a ferromagnetic material.

9. A permanent magnet rotor assembly as recited in claim 1, wherein said hub comprises a ferromagnetic material and said support members comprise a non-magnetic material.

10. In an electrical machine having a rotor and a stator, said rotor comprising:
a cylindrical hub;
a plurality of inwardly converging wedge-shaped support members located around and affixed to the periphery of said hub;
a plurality of wedge-shaped permanent magnets with radially extending outwardly converging sides disposed between said support members;
a plurality of plastically deformable cushions, one cushion being disposed between each of said magnets and said support members;
said sides of said magnets forming an angle with a plane parallel to a central radius through said magnet of a size such that the magnets are locked in place after said rotor ceases to rotate and the magnets will not fracture due to excessive compressive forces applied to the sides of said magnets.

11. A rotor assembly as recited in claim 10, wherein said cushion means comprises a material selected from the group consisting of nickel alloy, aluminum and fiberglass filled with epoxy.

12. A rotor assembly as recited in claim 10, wherein said cushion means comprises a magnetic material whose compressive yield strength is less than the compressive yield strength of said magnet.

13. An electrical machine rotor as recited in claim 10, further comprising:
electrically dampening means located around the peripheral surface of said support members; and
said support members having a plurality of holes for lightening and cooling the rotor.

14. In an electrical machine having a rotor and a stator, said rotor comprising:
a cylindrical hub;
a plurality of inwardly converging wedge-shaped support members located around and affixed to the periphery of said hub;
a plurality of wedge-shaped permanent magnets with radially extending outwardly converging sides disposed between said support members;
a plurality of cushions, one cushion being disposed between each of said magnets and said support members;
said cushions having a perforated side in contact with the walls of said support members and a smooth side in contact with said permanent magnets;
said sides of said magnets forming an angle with a plane parallel to a central radius through said magnet of a size such that the magnets are locked in place after said rotor ceases to rotate and the magnets will not fracture due to excessive compressive forces applied to the sides of said magnets.

15. In an electrical machine having a rotor and a stator, said rotor comprising:
a cylindrical hub;
a plurality of inwardly converging wedge-shaped support members located around and affixed to the periphery of said hub;
a plurality of wedge-shaped permanent magnets with radially extending outwardly converging sides disposed between said support members;
a plurality of cushions, one cushion being disposed between each of said magnets and said support members;
said sides of said magnets forming an angle within the range of 2 to 9 degrees with a plane parallel to a central radius through said magnet such that the magnets are locked in place after said rotor ceases to rotate and the magnets will not fracture due to excessive compressive forces applied to the sides of said magnets.

16. In an electrical machine having a rotor and a stator, said rotor comprising:
a cylindrical hub;
a plurality of inwardly converging wedge-shaped support members located around and affixed to the periphery of said hub;
a plurality of wedge-shaped permanent magnets with radially extending outwardly converging sides disposed between said support members;
a plurality of cushions, one cushion being disposed between each of said magnets and said support members;
said sides of said magnets forming an angle within the range of 6 to 8 degrees with a plane parallel to a central radius through said magnet such that the magnets are locked in place after said rotor ceases to rotate and the magnets will not fracture due to excessive compressive forces applied to the sides of said magnets.

17. A permanent magnet rotor assembly comprising:
a rotatable hub;
a plurality of inwardly converging wedge-shaped support members equally spaced around the periphery of said hub and affixed thereto;
a plurality of outwardly converging wedge-shaped permanent magnets located between said support members;
cushion means located between said support members and said magnets for uniformly distributing the compressive stresses existing between said support members and said magnets;
said cushion means have a perforated side in contact with the walls of said support members and a smooth side in contact with said permanent magnets.

18. A permanent magnet rotor assembly comprising:
a rotatable hub;
a plurality of inwardly converging wedge-shaped support members equally spaced around the periphery of said hub and affixed thereto to form a plurality of outwardly converging wedge-shaped slots therebetween;
a plurality of outwardly converging wedge-shaped permanent magnets, individual magnets disposed in individual outwardly converging wedge-shaped slots between said support members with a gap between said permanent magnets and the periphery of said hub; and
a plurality of cushion elements, individual cushion elements disposed between adjacent support members and permanent magnets for uniformly distributing the compressive stresses existing between said support members and said magnets;
said cushions have a perforated side in contact with the walls of said support members and a smooth side in contact with said permanent magnets.

19. A permanent magnet rotor assembly comprising:
a rotatable hub;
a plurality of inwardly converging wedge-shaped support members equally spaced around the periphery of said hub and affixed thereto to form a plurality of outwardly converging wedge-shaped slots therebetween;
a plurality of outwardly converging wedge-shaped permanent magnets, individual magnets disposed in individual outwardly converging wedge-shaped slots between said support members with a gap between said permanent magnets and the periphery of said hub; and
a plurality of cushion elements, individual cushion elements disposed between adjacent support members and permanent magnets for uniformly distributing the compressive stresses existing between said support members and said magnets;
said sides of said magnets forming an angle within the range of 2 to 9 degrees with a plane parallel to a central radius through said magnet such that the magnets are locked in place after said rotor ceases to rotate and the magnets will not fracture due to excessive compressive forces applied to the sides of said magnets.

20. A permanent magnet rotor assembly comprising:
a rotatable hub;
a plurality of inwardly converging wedge-shaped support members equally spaced around the periphery of said hub and affixed thereto to form a plurality of outwardly converging wedge-shaped slots therebetween;
a plurality of outwardly converging wedge-shaped permanent magnets, individual magnets disposed in individual outwardly converging wedge-shaped slots between said support members with a gap between said permanent magnets and the periphery of said hub; and
a plurality of cushion elements, individual cushion elements disposed between adjacent support members and permanent magnets for uniformly distributing the compressive stresses existing between said support members and said magnets;
said sides of said magnets forming an angle within the range of 6 to 8 degrees with a plane parallel to a central radius through said magnet such that the magnets are locked in place after said rotor ceases to rotate and the magnets will not fracture due to excessive compressive forces applied to the sides of said magnets.

21. A permanent magnet rotor assembly comprising:
a rotatable hub;
a plurality of inwardly converging wedge-shaped support members equally spaced around the periphery of said hub and affixed thereto to form a plurality of outwardly converging wedge-shaped slots therebetween;
a plurality of outwardly converging wedge-shaped permanent magnets, individual magnets disposed in individual outwardly converging wedge-shaped slots between said support members with a gap between said permanent magnets and the periphery of said hub; and
a plurality of plastically deformable cushion elements, individual cushion elements disposed between adjacent support members and permanent magnets for uniformly distributing the compressive stresses existing between said support members and said magnets.

22. The permanent magnet rotor assembly of claim 21 wherein said permanent magnets are tangentially magnetized.

23. The permanent magnet rotor assembly of claim 21 wherein said permanent magnets are radially magnetized.

24. The permanent magnet rotor assembly of claim 23 additionally including a plurality of shims, individual shims disposed in individual gaps between said permanent magnets and the periphery of said rotor.

25. The permanent magnet rotor assembly of claim 23 additionally including electrical dampening means disposed around the periphery of the rotor assembly.

26. The permanent magnet rotor assembly of claim 25 wherein said electrical dampening means include a plurality of non-magnetic dampening bars disposed in the outer periphery of the wedge-shaped support members.

27. The permanent magnet rotor assembly of claim 26 wherein said electrical dampening means additionally includes a non-magnetic hoop disposed around the periphery of the rotor assembly.

* * * * *